US012607031B2

(12) United States Patent
Waters et al.

(10) Patent No.: US 12,607,031 B2
(45) Date of Patent: Apr. 21, 2026

(54) DRONE SYSTEM WITH DISTRIBUTED BASING

(71) Applicant: MatrixSpace, Inc., Burlington, MA (US)

(72) Inventors: Gregory Lester Waters, Los Gatos, CA (US); Adam George Mirza, Somerville, MA (US); Dan William Nobbe, Crystal Lake, IL (US); Matthew T. Kling, Uxbridge, MA (US); Gary Michael Shapiro, Wakefield, MA (US); Alden Hayden Kelsey, Mountain View, CA (US)

(73) Assignee: MatrixSpace, Inc., Burlington, MA (US)

( * ) Notice: Subject to any disclaimer, the term of this patent is extended or adjusted under 35 U.S.C. 154(b) by 239 days.

(21) Appl. No.: 18/502,544

(22) Filed: Nov. 6, 2023

(65) Prior Publication Data

US 2024/0076891 A1     Mar. 7, 2024

Related U.S. Application Data

(60) Division of application No. 17/557,502, filed on Dec. 21, 2021, now abandoned, which is a continuation of
(Continued)

(51) Int. Cl.
| | |
|---|---|
| *G08G 5/55* | (2025.01) |
| *B60P 3/11* | (2006.01) |
| *B64C 39/02* | (2023.01) |
| *B64U 101/00* | (2023.01) |
| *E04H 6/44* | (2006.01) |
(Continued)

(52) U.S. Cl.
CPC .................. *E04H 6/44* (2013.01); *B60P 3/11* (2013.01); *B64C 39/024* (2013.01); *G05D 1/0088* (2013.01); *G08G 5/55* (2025.01); *G08G 5/57* (2025.01); *B64U 2101/00* (2023.01); *B64U 2201/104* (2023.01); *H04W 84/18* (2013.01)

(58) Field of Classification Search
CPC .... E04H 6/44; B64F 1/222; B64F 1/24; B64F 1/35; B64F 1/352; G08G 5/56
See application file for complete search history.

(56) References Cited

U.S. PATENT DOCUMENTS

| | | | | |
|---|---|---|---|---|
| 9,524,648 B1 * | 12/2016 | Gopalakrishnan | ...... | G06F 21/00 |
| 9,973,261 B1 * | 5/2018 | Hardy | ..................... | H04W 4/06 |
(Continued)

FOREIGN PATENT DOCUMENTS

| | | | |
|---|---|---|---|
| CA | 3131764 A1 * | 5/2022 | |

*Primary Examiner* — Christopher P Ellis
(74) *Attorney, Agent, or Firm* — Ryan, Mason & Lewis, LLP

(57) ABSTRACT

A system for basing drones is described. A network of geographically diverse hangars provides storage and charging locations as well as backhaul communications infrastructure and video monitoring. As drones are needed, a central command point tasks an available drone, which may or may not already be located in proximity to a target. If additional drones are needed, drones can be flown to the area of interest and continuous coverage provided by charging drones while an active drone is conducting the mission, then rotating charged drones into the active mission. Structures for the hangars, the overall system, and methods of operation are described.

22 Claims, 8 Drawing Sheets

Related U.S. Application Data application No. 17/536,517, filed on Nov. 29, 2021, now abandoned.

(51) Int. Cl.
| | | |
|---|---|---|
| *G05D 1/00* | (2006.01) | |
| *G08G 5/57* | (2025.01) | |
| *H04W 84/18* | (2009.01) | |

(56) References Cited

U.S. PATENT DOCUMENTS

| 10,586,464 | B2 * | 3/2020 | Dupray | G08G 5/26 |
|---|---|---|---|---|
| 10,611,474 | B2 * | 4/2020 | Kumar | H04W 4/029 |
| 11,355,021 | B1 * | 6/2022 | Miao | G08G 5/26 |
| 11,565,807 | B1 * | 1/2023 | Zuckerman | G05D 1/101 |
| 11,683,679 | B2 * | 6/2023 | Sasi | H04W 12/037 |
| | | | | 370/316 |
| 11,804,138 | B2 * | 10/2023 | Foland | G08G 5/32 |
| 2016/0275801 | A1 * | 9/2016 | Kopardekar | G08G 5/55 |
| 2016/0364989 | A1 * | 12/2016 | Speasl | G08G 5/57 |
| 2017/0225802 | A1 * | 8/2017 | Lussier | B64U 10/20 |
| 2018/0107209 | A1 * | 4/2018 | Hardee | G08G 1/20 |
| 2018/0137454 | A1 * | 5/2018 | Kulkarni | G06Q 10/083 |
| 2018/0186473 | A1 * | 7/2018 | Erickson | B60L 53/665 |
| 2018/0290764 | A1 * | 10/2018 | McMillian | B64U 70/90 |
| 2018/0312276 | A1 * | 11/2018 | Miller | B64U 10/14 |
| 2020/0055613 | A1 * | 2/2020 | Miller | G05D 1/0676 |
| 2020/0349852 | A1 * | 11/2020 | DiCosola | G08G 5/55 |
| 2020/0401016 | A1 * | 12/2020 | Zapata | H04N 7/185 |
| 2020/0404175 | A1 * | 12/2020 | Terry | H04N 23/45 |
| 2021/0031947 | A1 * | 2/2021 | Wankewycz | B60L 53/51 |
| 2021/0066913 | A1 * | 3/2021 | Syracuse | B64U 50/37 |
| 2021/0107684 | A1 * | 4/2021 | Le Lann | B64F 1/26 |
| 2022/0392672 | A1 * | 12/2022 | Getman | A61H 23/0218 |
| 2023/0059147 | A1 * | 2/2023 | Oliver | F16B 21/02 |
| 2023/0095505 | A1 * | 3/2023 | Dicosola | G09F 21/08 |
| | | | | 701/3 |
| 2023/0154337 | A1 * | 5/2023 | Foland | G08G 5/34 |

* cited by examiner

DRONE SYSTEM WITH DISTRIBUTED BASING

CROSS REFERENCE TO RELATED APPLICATIONS

This application is a Divisional of U.S. patent application Ser. No. 17/557,502, entitled "Drone System With Distributed Basing", filed Dec. 21, 2021, which is a Continuation of U.S. patent application Ser. No. 17/536,517, entitled "Drone System With Distributed Basing", filed Nov. 29, 2021, both of which are hereby incorporated by reference in their entirety.

BACKGROUND

Police departments, fire departments, rescue and other first responders have increasingly employed aerial drones to provide situation awareness regarding public safety or incident response. Typically, this requires either transporting equipment to the area of interest, or flying the drone in from a central location that may be very distant from the area where the drone asset is stored. Either way, the speed of response to an emerging situation is compromised. Furthermore, because battery operated, lightweight drones have limited flight time due to battery life, it is difficult to maintain persistent coverage at any distance from one central location. Proposed are solutions to these problems that provide a robust, distributed network of available drone or autonomous vehicle assets that can be rapidly deployed as needed from a network of hangar locations equipped with networked sensors, charging facilities, communications, and video monitoring.

SUMMARY

The distributed basing system described below is a network of small hangars that are mounted on public infrastructure such as light poles. Each hangar may host a drone that is recharged and protected from the elements by the hangar until it is needed. These hangars, or "Drone in a box" stations are networked and can be commanded to deploy its drone(s) upon demand. The hangar can also act as a base node for communication with the drone, and routes control and data information from the drone to a central authority. Additional range and endurance are provided by staging platforms that are simplified versions of the hangar base. The hangar design allows for autonomous landing operation and positive engagement with charging elements, and rotating, long endurance missions where an active drone is deployed while spares are recharged in the area and then cycled in for continuous coverage.

DETAILED DESCRIPTION

Figure 1:
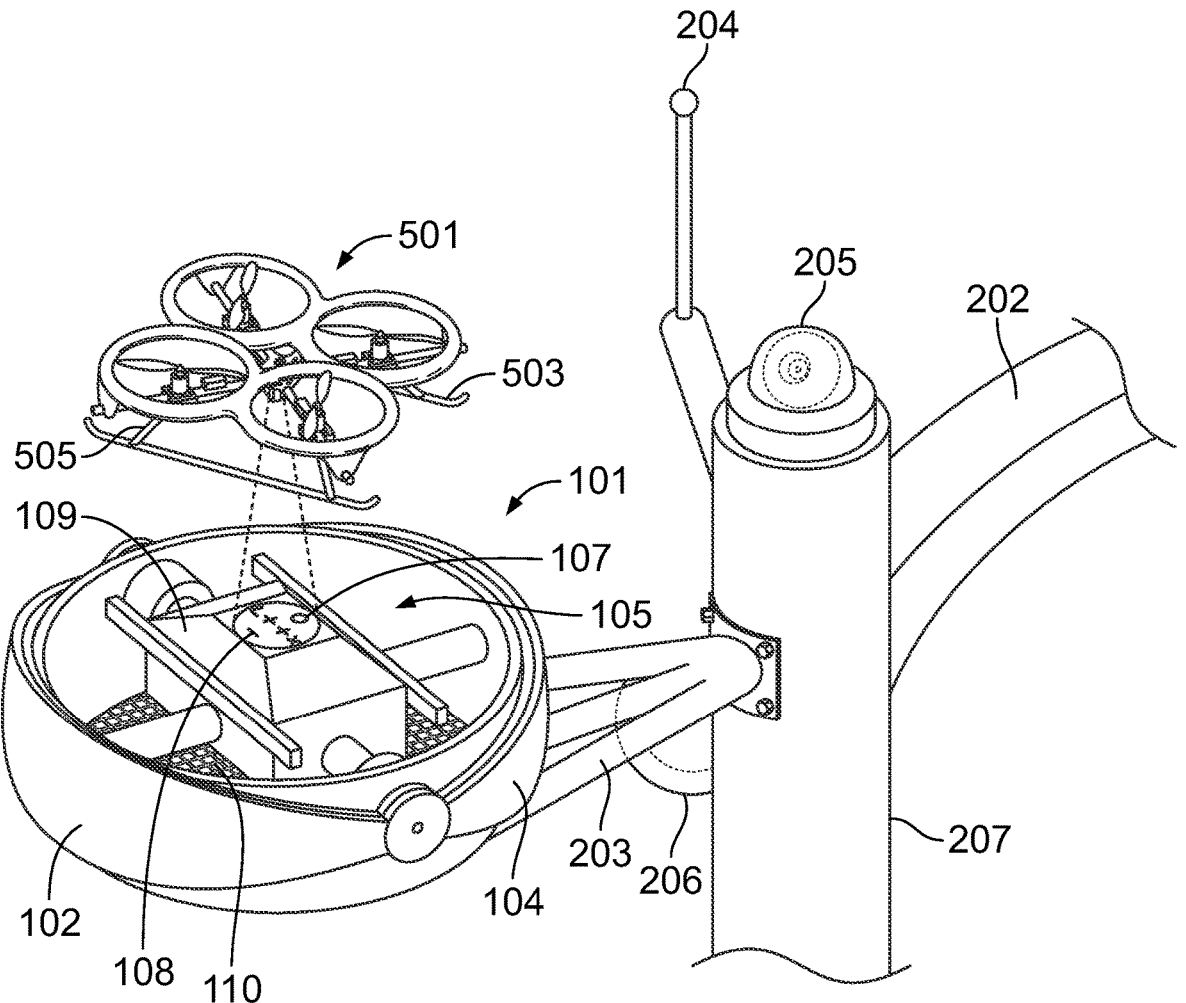
FIG. 1 is an exemplary diagram showing an exemplary hangar.

In disclosed examples, a system of two or more drone hangars and one or more drones, including at least one drone that is housed in the hangar, each said hangar including a communication link to a central facility and a communication link to one or more of said drones.

In some examples, one or more of said hangars is mounted on an elevated structure substantially above surrounding terrain. In some examples, one or more of said hangars includes a surveillance camera for monitoring operation of a drone.

In some examples, one or more of said hangars connects to fixed public infrastructure for power. In some examples, one or more of said hangars connects to a public high bandwidth infrastructure service for communications to a central control location.

In some examples, one or more of said hangars connects to the wired public switched network for communications to a central control location. In examples, one or more of said hangars communicates with a central control location using a dedicated network.

In some examples, said drones are in radio communication with said hangar. In examples, said hangar comprises at least one antenna. In examples, said radio communication is by mm wave radio. In examples, said radio communication is by Wi-Fi. In examples, said radio communication is by cellular radio.

In some examples, said drones are equipped with one or more sensors comprising an infrared imager, a video camera, radar, lidar, an acoustic sensor. In examples, the one or more sensors of said drones are configured to collect information while docked within one or more of said hangars. In some examples, said video camera is configured to send real time video data to one or more of said hangars.

In some examples, said drones form a mesh network. In examples, said mesh network includes one or more hangars.

In some disclosed examples, a drone hangar comprising a retractable cover, a mating surface, and a battery charger, wherein said mating surface is tapered so that it is narrower at the top than at the bottom; said surface corresponding to a central area of an aerial drone.

In some examples, said mating surface includes charging contacts. In examples, said charging contacts are strip contacts. In examples, said mating surface includes a shelf that receives a corresponding surface of an aerial drone. In examples, said shelf comprises a plurality of horizontally projecting tabs.

In some examples, said battery charger is an inductive charger. In some examples, said retractable cover has a spherical upper surface. In some examples, the elements of said retractable cover are oriented in a vertical position when open.

In some examples, when said retractable cover is open, the structure presents at least 50% open area to downward airflow through the hangar. In some examples, when said retractable cover is open, the cross sectional profile of the hangar to downward airflow is tapered so turbulence is reduced.

In some examples, said hangar is mounted on a light pole. In some examples, said hangar is mounted on a vehicle. In some examples, said hangar is mounted on a roof or an elevated platform.

In some disclosed examples, system of distributed hangars comprising: a plurality of hangars, one or more of which house an aerial drone; and a central control point connected to said plurality of hangars by a communications network; wherein one or more of said plurality of hangars are distributed so that said aerial drones can roam from one hangar to another such that at least 10% of said drone's endurance is available for a mission when roaming from a first hangar location to a second hangar location.

In some examples, at least one of said plurality of hangars is equipped with a video camera for monitoring the flight of an aerial drone from said central control point. In examples, at least one of said plurality of hangars has a retractable cover. In examples, one of said drones communicates with one of said hangars using a millimeter wave radio when deployed.

In some examples, one or more of said plurality of hangars have at least 50% open area when viewed vertically through said hangars when one of said aerial drones is landing. In examples, a plurality of simplified hangars are for charging drones. In examples, one of said simplified hangars is located within the video field of view of said video camera.

In some examples, two or more simplified hangars are located within the video field of view of said video camera. In examples, two or more of said plurality of simplified hangars are located on a mobile vehicle. In examples, one or more of said plurality of hangars is equipped with inductive charging.

In some examples, one or more of said plurality of hangars is equipped with direct contact charging points.

In some disclosed examples, a method of operating a network of distributed bases for drones, comprising the steps of: a. Basing drones at a plurality of basing locations in an area, wherein at least two of said basing locations are separated by a distance that represents at least one fourth of the drones rated range; b. dispatching a first drone to a location of interest in the area from a first basing location that is closest to said location of interest; c. dispatching a second drone from a second basing location that is farther from said location of interest than the first basing location of said first drone, to a third basing location nearer the first basing location than the second basing location; and d. alternating said first and second drones at the location of interest such that when said first or second drone returns to said first or second basing location for charging, said other first or second drone is dispatched to said location of interest.

In some examples, a third drone is dispatched to a second basing location that is the next nearest basing location to said location of interest, and said third drone is alternated with said first and second drones such that continuous monitoring of said location of interest is achieved.

In some examples, the dispatching and basing of said second and third drones is automatic. In examples, said basing locations are hangars. In examples, said closest basing location is a mobile basing location.

In some examples, said drones are dispatched from a central location. In examples, said central location is a mobile location. In examples, the method including dispatching the second drone from the second basing location to the first basing location.

FIG. 1 shows an exemplary hangar 101, shown with the hangar open. The top portion of the hangar is defined by clamshell style doors 102, 104 that are opened and closed as needed. Other retractable roof arrangements are possible, including a sliding top or a different number of door segments. The illustrated embodiment has the advantage of a compact arrangement in the retracted position, and allowing rain or snow to easily roll off the cover when closed. The illustrated arrangement is also mechanically simple, since the doors can be operated around two pivot points. More or fewer door segments can be used as desired, and the cover can be in other shapes, for example a sliding top.

The hangar contains an interior docking area 105 where drones are docked. The docking area can include a platform 107 with an inductive charging pad, or advantageously the docking area may also be equipped with mating surfaces 109 that receive corresponding openings or protrusions on the drone as further explained below, for example receiving skids 503. The mating and landing surfaces include either inductive charging pads or contacts for charging the batteries of a docked drone as well as terminal guidance, such as an optical target 108, for landing the drone on the hangar. Note that other landing guidance could be provided by radio communication, radar, or lidar for example, either on the hangar, on the drone, or both. GPS receivers may be part of the hangar location and guidance system also. Below the platform and mating surfaces are the power and controls for the hangar, a battery charger, and a mechanism for operating the doors. A bird screen 110 covers the bottom of the hangar and allows air flow down through the screen while preventing birds or other animals from taking up residence in the hangar.

The hangar is conveniently mounted on a utility pole, such as a light pole, 207. Light poles already have power provided and provide an elevated platform in existing right of way. A downward facing camera 206 provides a security view for the site, which is conveniently illuminated by the light pole.

Figure 2:
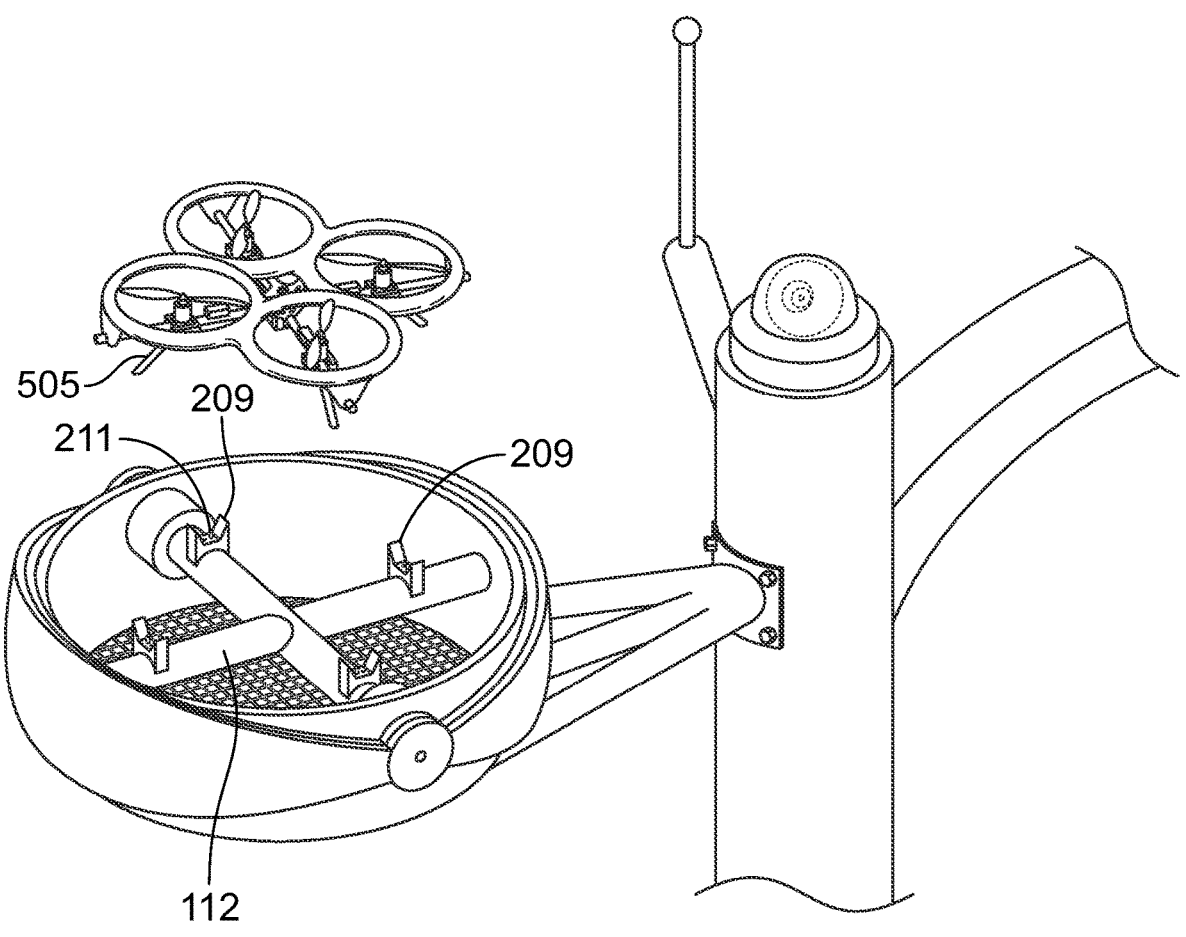
FIG. 2 shows an alternate docking arrangement for the hangar.
Figure 3:
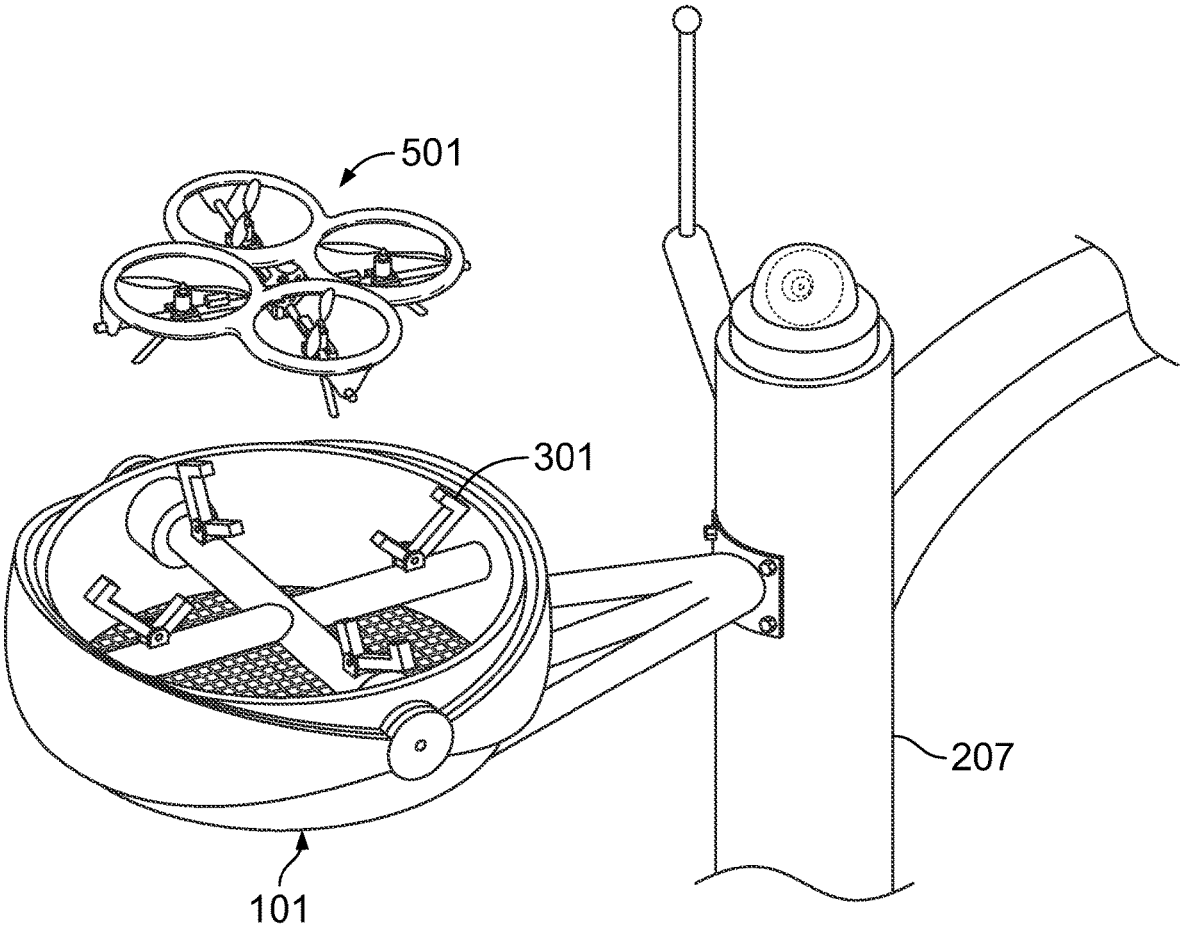
FIG. 3 shows an alternate docking arrangement for the hangar.

FIGS. 2 and 3 show alternate mating arrangements for the enclosable platform. In FIG. 2, the arms 505 of a drone, shown as a quad copter 501, rest in mating notches 209. Arms 505 may be separate structures on the drone, or could be the mounting arms for the motor nacelles. In FIG. 2, the notch 209 includes a pair of contacts 211 for charging through mating contacts on arms 505. In FIG. 3, the notch includes a clamp 301 that securely closes over arm 505 to hold the drone in place. In order to facilitate positive engagement, the charging contacts 211 may be magnetized. Other arrangements are contemplated depending on the geometry of the drone. For example, the mating arrangement could reflect a six rotor vehicle or a one rotor vehicle with three arms, or skids shaped in a ring.

Figure 4:
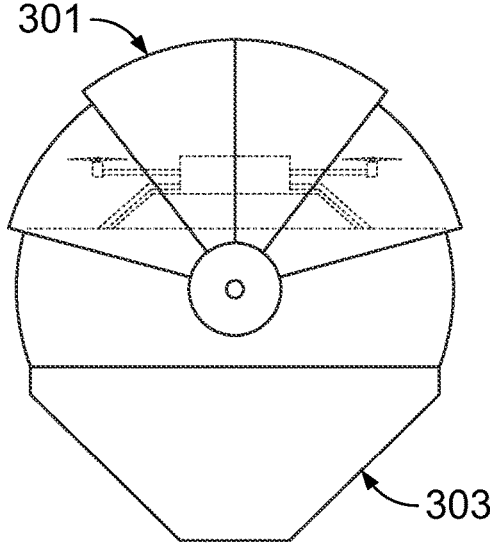
FIG. 4 is a view of a hangar showing the hangar in a closed position.

FIG. 4 shows the hangar in a closed position. The clamshell doors form a dome like structure 301 that is snow, ice, and water resistant, protects a stored drone from high winds, and can advantageously be made from a material that is not radio opaque. The bottom cover 303 is optional and may be sealed, or where down wash is still desired, can have open area at the bottom covered by a screen such as 110 in FIG. 1.

Figure 9:
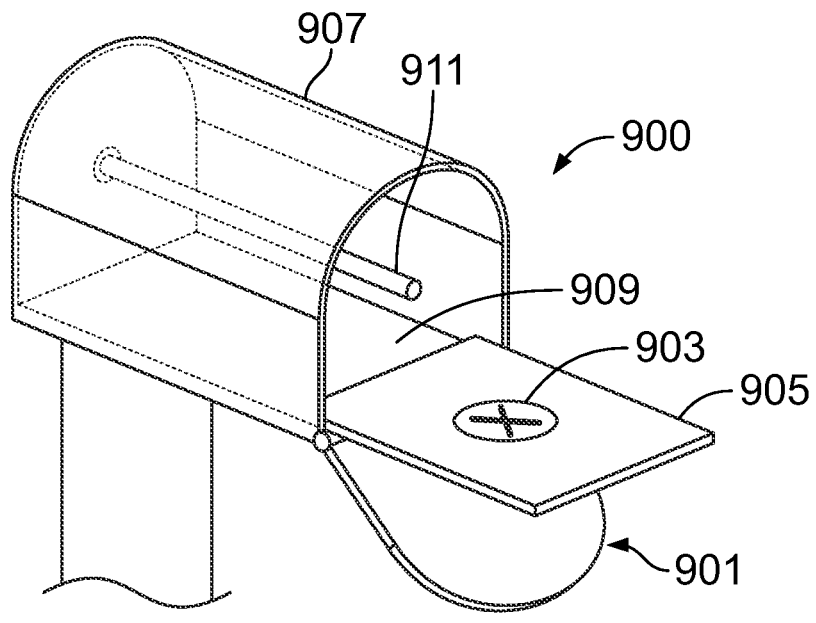
FIG. 9 is an alternate enclosure design wherein the drone enters from the side.
Figure 10:
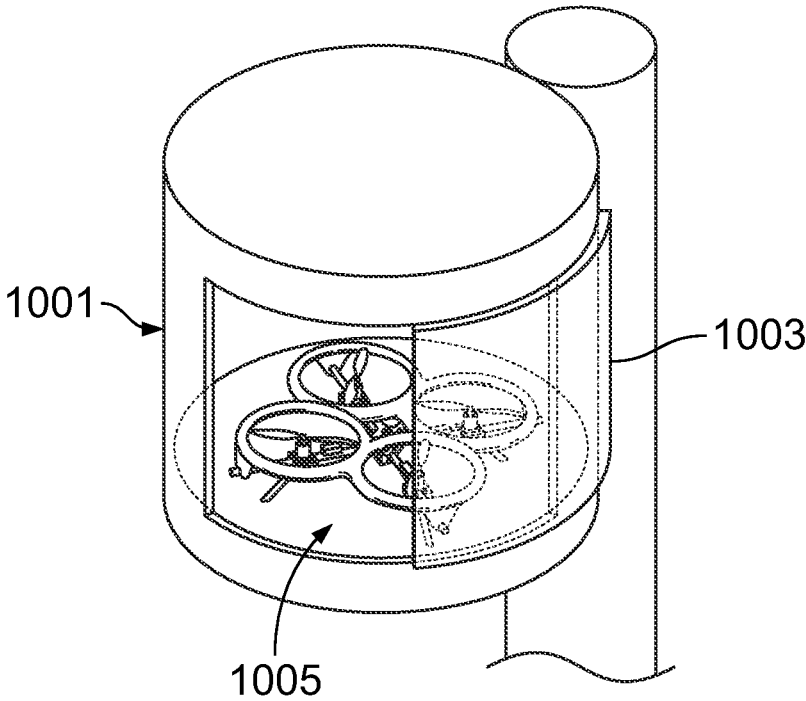
FIG. 10 is an alternate enclosure design wherein the drone also enters from the side.

FIGS. 9-11 show further hangar arrangements. FIG. 10 shows a mailbox style hangar 900 with a drop down door 901, retractable platform 905, and rounded cover 907. Optical target 903 assists with auto-landing. As with the hangar of FIG. 1, hangar 900 can be pole-mounted and shares the same potential docking and charging features. If the interior floor 909, door 901, and platform 905 are omitted, hangar 900 can be fitted with a "bat hook" 911 such that a drone is flown onto and suspended from the hook, with cover 907 essentially acting as a rain cover.

FIG. 10 shows a similar concept but with a side sliding door 1003. Floor 1005 accommodates an inductive charger, and the entire hangar 1001 is readily pole mounted.

Figure 11A:
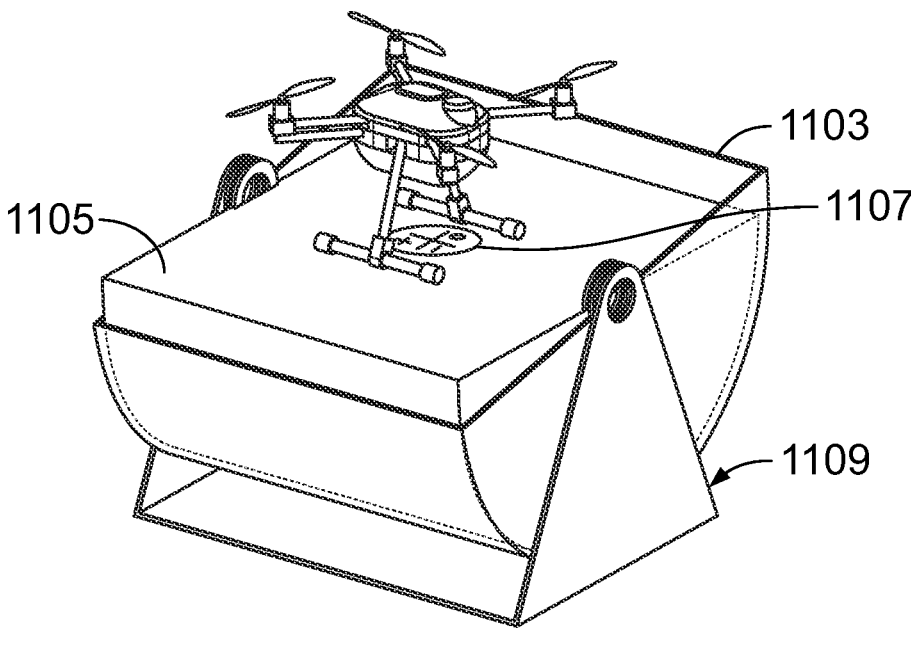
FIG. 11A is an alternate enclosure design with a rotating lid.
Figure 11B:
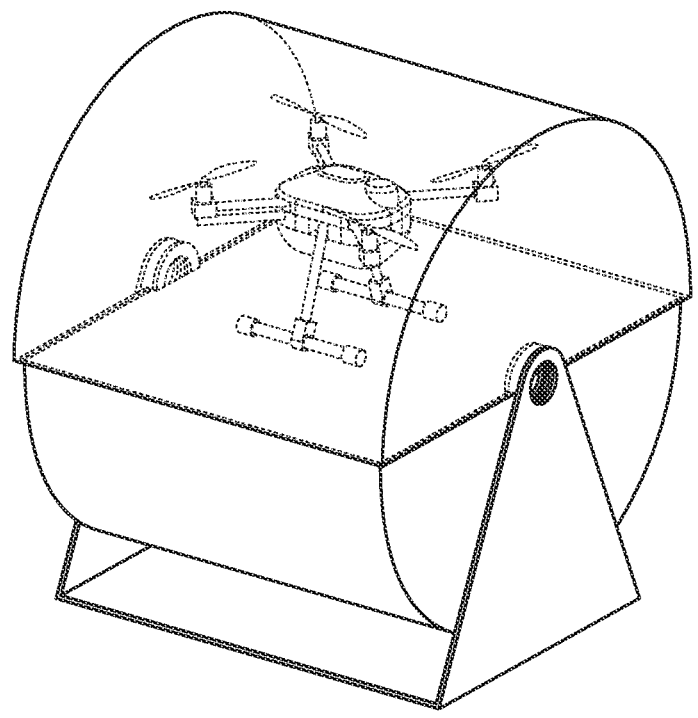
FIG. 11B shows the enclosure of FIG. 11A in the closed position.

FIG. 11A shows a swing cage design with a cover 1103 that pivots from an open position under platform 1105 to a closed position as shown in FIG. 11B. Inductive charging is provided under the platform 1105 and an optical target 1107 for landing. The pivoting cover and platform are mounted on a base 1109 that is conveniently attached to any high surface and is especially well suited to roof mounting or an elevated platform.

Figure 5:
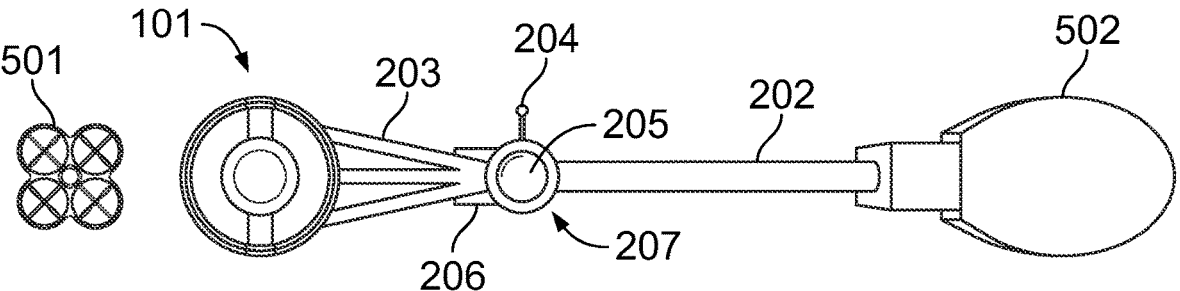
FIG. 5 is a top down view of a hangar.

FIG. 5 shows a top-down view of a hangar 101 mounted on a light pole 207. Light poles conveniently are already provided with power which can be used for the actuators, charging circuitry, cameras, and radios of the hangar. The pole incorporates a street light 502 mounted on light arm 202 and a mount 203 that secures the hangar 101 to the pole 207. Communications for the hangar 101 are advantageously mounted on the pole 207 as well, to provide better clearance from the hangar doors and radio visibility for an antenna 204 used to communicate with the drones 501. In an embodiment, the pole 207 is a utility pole with access to power and a communications network infrastructure, wired or wireless. While the figures contemplate pole mounted installations, installation could be accomplished on any structure with sufficient clearance over surrounding objects to allow a relatively unobstructed field of view from the hangar location from just above the horizon in 360 degrees, such as a rooftop or structure on a roof, to allow for maximum visibility and communication range in applications where drones are required by rule to be operated within the visual range of an observer-operator or the communications band used by the drone requires line of sight operation to the antenna mounted on the hangar.

Many municipalities may have dedicated communications infrastructure for municipal use only mounted on existing light and utility poles, or have leased the right to private companies to attach backbone infrastructure such as CATV to those structures. An embodiment of the invention leverages these existing utilities by connecting to them, when available, on pole 207. Alternatively, antenna 204 can be used to connect wirelessly to a local area network such as Wi-Fi, or a wireless wide area network such as the cellular 4G/5G network. A 360 degree field of view camera 205 allows a drone flown from or in the vicinity of the hangar to be remotely monitored on video. For additional security, a look down camera 206 for local surveillance of the installation may be included.

Figure 6:
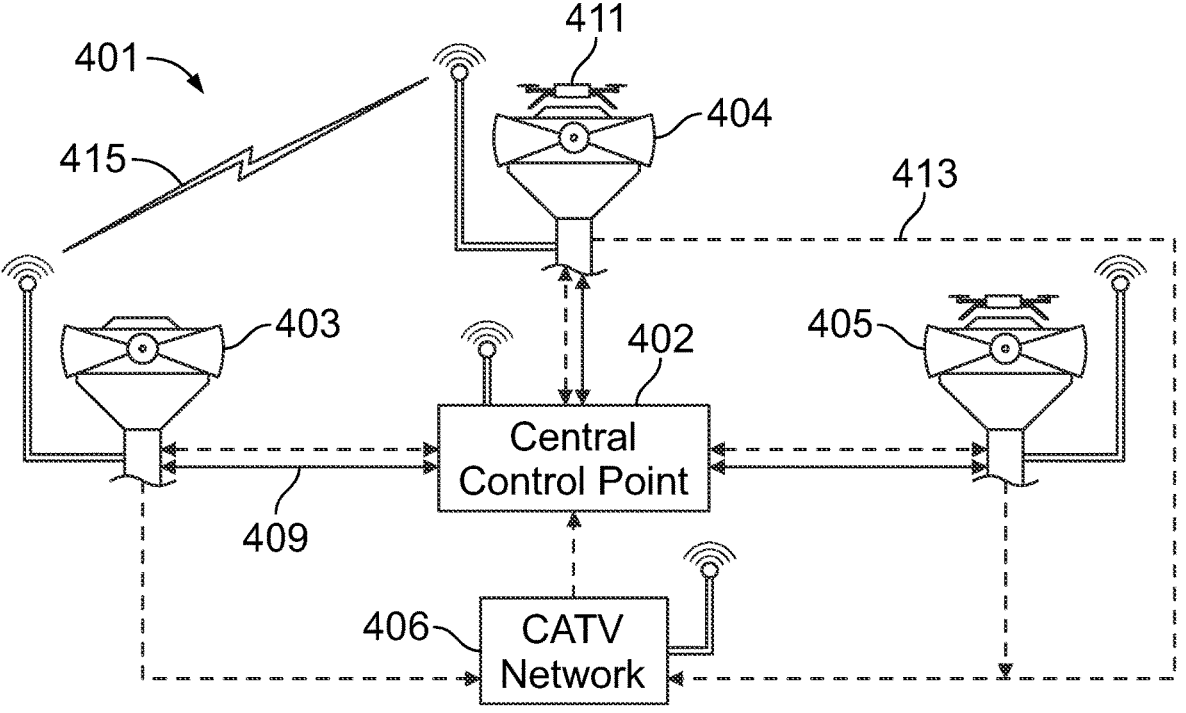
FIG. 6 is an exemplary diagram showing a network of hangars deployed in a metropolitan area.

FIG. 6 shows a network of hangars 401. The hangars 403-405 are connected by RF or hardwired connections using either existing communications infrastructure or a wide area network to a control point 402. Existing municipal infrastructure such as Wi-Fi, fiber optic, or coaxial networks (CATV Internet for instance, 406) may provide a secure network for all of the hangars and associated drone assets, using fixed backhaul links shown in solid line 409. Alternatively, the backhaul may be wireless on dashed links 413. By equipping each remote location with additional antennas and radios, the hangars can themselves form a wireless network for communication back to central control point 402 using hangar to hangar links 415. It is possible that some or all of the hangars can be linked together using the same radio communication network that the drones 411 use. This may be Wi-Fi or a different wireless or wired/cabled network. The communications network may be a mesh network, and each of the drones and hangars would serve as additional nodes in the mesh, thus extending the overall network range and also creating additional redundant links.

Drones, particularly battery powered rechargeable drones, have limited range and power. Flying drones from a single location to remote areas of a large municipality is not practical, so to allow an operator to control drones from central control point 402 with acceptable response times, hangars are distributed across the area. The hangars are spaced sufficiently close that a drone can roam from the coverage area of one hangar to the next based on the capabilities of the drone. For example, drones capable of 30 mph flight with a 30 minute endurance, would accept hangar spacing of several miles while still allowing some loiter time, an allowance for headwind, and an allowance to avoid a deep discharge of the battery. The radio antenna 204 allows hangars to form their own network for mesh network communications either to a hangar with access to the wider area communications infrastructure, or if the frequency plan and hangar spacing allows, an independent network that backhauls communications to a central control point. Because the drones themselves act as a communications node in the network, the drones can combine with each other and the hangars to form a mesh network for range extension and redundancy, independent of any fixed infrastructure.

It is not necessary that every hangar host a drone, and in fact drones can be deployed from a single convenient location such as central control location 402 and pre-positioned at one or more hangars as needed. When aerial drone support is needed, an operator at location 402 commands a selected hangar, for example hangar 404, to deploy a drone 411. The drone 411 then performs a mission within range of hangar 404. In additional or alternative examples, the drone 411 can deploy autonomously, such as in response to a predetermined set of instructions, sensor data, timing guidelines, and/or based on actions of another drone, as a list of non-limiting examples.

Drones 411 are sized to fit within the hangar, and includes terminal guidance to allow it to auto-land on the remote hangar platform. The drone can carry any payload within its capacity, but in a preferred embodiment, the payload is an infrared imager and video camera and possibly radar and lidar and other sensors such as acoustic sensors. The drone is GPS equipped and includes an altimeter. The drone downloads its sensor data in real time along with its location and flight path information to an available RF link at a hangar, where the data is relayed to a central control point 402.

In one embodiment, the RF link to the aerial drone is a line of site link operating at mm wave frequencies such as described in co-pending application Ser. No. 17/326,046. In urban areas, the public 4G/5G network may also provide a previously installed infrastructure for the drones that would also allow for the elimination of much of the backhaul network otherwise required. Other spectrum could also be used, based on availability.

Command and control is uplinked in the reverse direction. Because video requires higher bandwidths than the drone's controls, the channel dedicates the bulk of the available bandwidth to the downlink. The drone advantageously includes mating surfaces for docking with the hangar, especially if the drone is intended to be charged by mating with charging contacts as opposed to an inductive charger. One advantageous mating surface is the central open area of the drone defined by landing skids 503 or a donut shaped drone body. An alternative mating surface are arms 505, in which case skids 503 are not needed. Another mating surface may be the molded fairings holding the drone's motors. The mating surfaces include point contacts for charging at points where surface contact is expected with the hangar, or alternatively, the entire mating surface may be arranged as a conductive contact, reducing the degree of precision required in docking to the hangar.

The drone may also be active while docked at the hangar, thus not only being charged, but actively sensing and/or communicating. For example the drone may be actively scanning with its radar, listening with acoustic sensors, or scanning with cameras if the hangar allows proper viewing. The drone may also be actively communicating through the wired connection, one or more wireless networks, or any combination thereof.

A typical drone will be battery operated drones and have a fully loaded weight on the order of 10 pounds. The payload will include a full motion video camera and thermal sensors, along with the RF radios for communication with the nearest hangar, other drones, or a 4G/5G cellular network. Drones in this class will have a limited endurance time and maximum airspeeds in the 30-45 mph range. The radius of even a modest metropolitan area from a geographic center leaves large portions of the city beyond the range of a centrally operated drone, and even larger areas that may be within the nominal range of a drone but without enough endurance to allow for any meaningful loitering time over an area of interest. Municipalities are also unlikely to invest in deploying every squad car with portable drones, and even if they could, there is no current capability that would allow for the officer on scene to maintain surveillance beyond the endurance limit for one drone, or to manage a pursuit using the drone if the pursuit takes the drone out of range of the launch point. Furthermore, finding suitable locations to set up, launch, and control a drone on an ad hoc basis is problematic.

The present invention provides solutions to these problems by distributing a drone fleet to a series of distributed remote hangars, such as those shown in FIG. 1. The hangars are distributed throughout the municipal area of interest. The exact density is determined by the needs of the municipality, but in general, it is contemplated that all points within the serviced area will be within a nominal response time measured in minutes from the nearest hangar containing a drone with a minimum endurance on arrival. For example, if the desired metric is 20 minutes of endurance on arrival for a drone with a maximum speed of 40 mph and an endurance time of 30 minutes, a populated hangar would be required on a spacing of roughly 3-4 miles, to allow for safety margins for safe return and operation in wind.

To support longer endurance missions, additional simplified hangar platforms can be advantageously provided to multiply the number of available charging points. These additional platforms may not require full video control or communications, merely power for charging and opening/closing a cover if needed, and can be mounted on the same pole or nearby the hangar of FIG. 1, to provide additional charging docks. The simplified platform may omit the retractable cover, skyward video camera, and high speed backhaul links and only provide the basic docking and charging function for a drone that is only temporarily resident in the area.

The drones need to be supported by a sufficient number of hangar and staging platforms to allow for the continuous surveillance mode described further below, and also to account for the effective safe line of sight control range of the drones in the millimeter wave region, which is expected to be on the order of 1-2 miles. The drones may also use communications systems such as cellular, Wi-Fi, Bluetooth or other standards and may include mesh networking. Furthermore, it is advantageous for over the horizon remote operation if the operator can maintain visual contact with the drone using the upward facing cameras and other networked sensors as appropriate. Accordingly, for a given population of fully supported, distributed hangars containing a prepositioned drone, it is advantageous to have a larger population of hangar platforms that are not always occupied but provide distributed communications support and on-the-go recharging, and for even higher operational tempos, additional simplified platforms for providing charging points on or near a fully featured hangar location.

An operational scenario for the distributed hangar network is now described. On receiving a call for aerial drone support, an operator at a central location dispatches a drone from a conveniently located hangar, or it is autonomously dispatched and operated. At the same time, additional drones from more distant hangars are activated by the system as well. The primary drone is dispatched to the location of interest and the video and sensor feed is provided to the network operator. Meanwhile, supporting drones are relocated from more distant hangars to the nearest hangar or staging platform in the area of interest, or to secondary charging points near the primary hangar. This process can be automatic for the system, as the locations for each hangar and platform are known with precision and the drones can auto-land on the platforms.

If the mission needs to be extended beyond the endurance of the first responding drone, the first responding drone auto-lands on the nearest available hangar or staging platform to recharge. The nearest drone in an acceptable state of charge is deployed to replace the first responding drone before it is forced to land. In this way, surveillance over the area of interest can be maintained indefinitely, as long as the total number of drones in the area is sufficiently large relative to the charging time for a drone. For example, if charging times for 80% of the nominal maximum endurance are roughly 4x the resulting flight time, four charging and one active drone will provide essentially unlimited endurance. The network of drones would have moved, autonomously or under human control, to stage drones at adjacent hangars for this persistent surveillance mode. For example, as soon as a drone is dispatched to a location of interest, a more distant drone is dispatched to the now vacated basing location, where it is charged until the first drone must return for charging. When the first drone is near the end of its endurance, the second drone is then dispatched to maintain continuous coverage. If charging times are not fast enough to allow two drones to maintain continuous coverage, a third drone can be added to the rotation out of a next nearest basing location. Alternatively, a mobile platform such as FIG. 7 can be used to provide multiple charge locations near the area of interest, particularly for a higher intensity mission.

A variant mission is a pursuit case where the initial responding drone is tasked with tracking a target. The supporting deployment strategy will vary depending on the speed of the tracked target. Foot pursuits will require a similar supporting strategy as above. A vehicle pursuit will require positioning supporting drones along the projected timeline of the vehicle. Because vehicle average speed may exceed the speed of the drone, in the vehicle pursuit case the operator deploys drone resources based on the direction and speed vector of the target, anticipating the target's arrival in the space that will be covered by the next drone. This can also be implemented autonomously.

A further enhancement to the system is to provide each drone with a 5G communications capability based on the 5G spectrum, particularly between 700 MHz and 40 GHz. This allows each drone to appear as a terminal device in the public 5G network, as long as the drone is in the coverage area of a 5G network operating in that frequency. When the drones are equipped with the phased array millimeter wave radios described by co-pending application Ser. No. 17/326, 046, the drones may cooperate with each other to form mesh networks that extend the range of the drone swarm to connect back to a hangar communications point.

The hangar's retractable cover may be a hemispherical clam shell arrangement allows rain or snow to easily slide off the surface when closed. The leaves of the cover rotate away and down when opened, so that in the fully opened position, the retractable cover is disposed near or below the lowest point in a drone's approach to the hangar. The opened retractable cover presents a minimum cross section to downward airflow from the aerial drone, which reduces ground effect turbulence from the drone when landing. When a flat landing area is not used, and the mating surface is a central upwardly projecting tapered surface, the mating surface is supported on tubular struts that leave much of the space in the landing area free from obstruction to downward air flow, with the primary mating surface allowing relatively smooth flow in a downward direction. The ground effects caused by downward flow rebounding off of a confined solid surface can cause turbulence issues that make autonomous or manual docking difficult. Leaving the area below the mating surface and the structures holding the retractable cover open as much as possible reduces these effects. The actuators, motors, and charging elements for the hangar are located in or directly below the mating surface. In this way, ground effects are minimized, smooth air flow downward through the hangar is promoted and the drone is more stable and controllable when docking.

In a preferred embodiment, the open area is at least 50% of the surface area presented to a landing drone inside the boundary of the enclosure. However, the objective is to minimize ground effect turbulence and to that end, open area can be selectively provided around the periphery corresponding to the locations of the rotors on the drone, or streamlining the objects that are in the horizontal plane of the landing area such that turbulence from rotor downwash is minimized.

The docking system allows for a drone to be remotely and automatically recharged and re-deployed without intervention from an operator. In order to correctly position the drone for landing at a hangar, the drone optics are focused on an optical target 108 on the hangar platform, allowing either a remote operator or the drone software to align the drone for docking. It is particularly advantageous to construct the mating surface as positive conical or other upwardly tapered surface, that enters a corresponding opening on the drone. The drone settles on that surface, being restrained by a circumferential series of tabs or a shelf that defines the landing point for the drone. The tapered surface avoids turbulence and flight instability from ground effects as the drone lands, and once the drone is positioned so that the tapered surface is within the open central area of the drone, gravity will pull the drone into firm and correctly positioned mating engagement with the mating surface. Because engagement is positive and the drone slides onto the tapered surface, engagement with the tabs or shelf is guaranteed and these surfaces can be constructed as contacts for charging the drone. Preferably, a contact point on the drone's landing skids or on the interior periphery of the mating area engages with the tabs or shelf. For example, the shelf can contain strip contacts on one half of the perimeter of the mating surface while the other half is a strip contact that is a charging ground.

An alternative arrangement for a mating surface are surfaces molded on the drone to mate with multiple matching surfaces such as those shown in FIGS. 2 and 3 at 211, or clamp 301 in FIG. 3. These surfaces can be mounted on a platform or as shown on a suspending frame 112 to minimize downwash ground effects. Again, once the drone is correctly positioned over the hangar, gravity will cause the drone to correctly settle into the mating surfaces, with charging plates or contacts 211 advantageously placed at the point of surface contact to provide direct charging if an inductive charger is not used.

Figure 7:
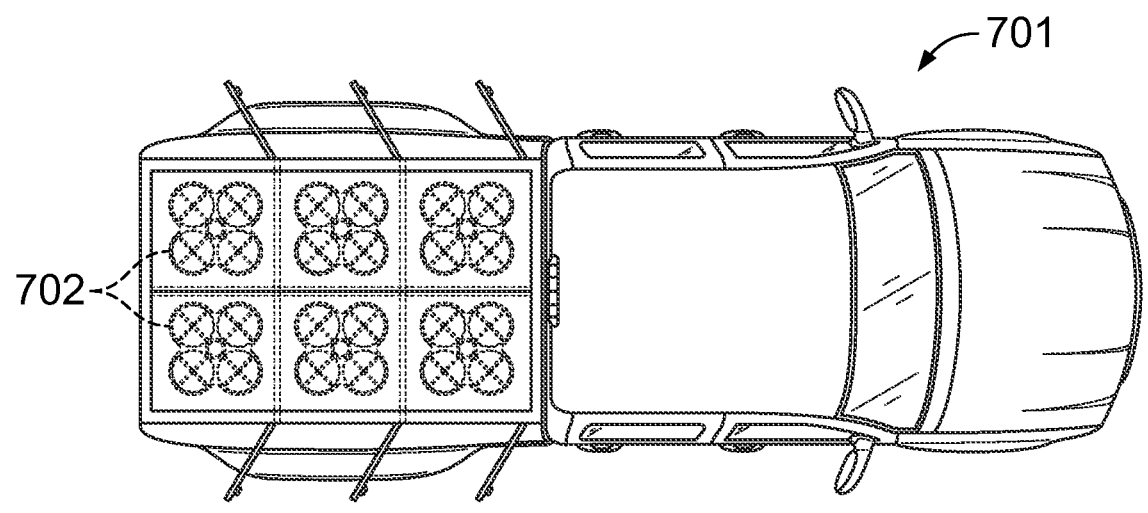
FIG. 7 is a top view of hangars mounted on a truck.
Figure 8:
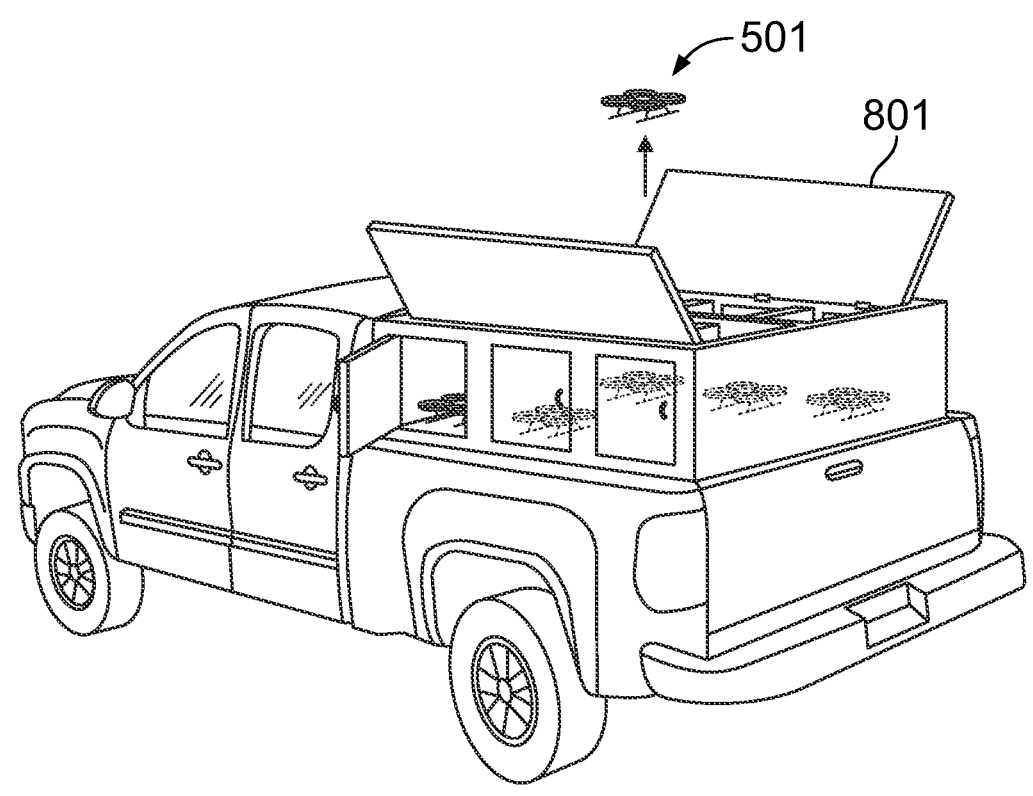
FIG. 8 is a perspective view of FIG. 7.

Alternatively, instead of mounting additional charging points on remote poles, a mobile platform such as a van or truck can be equipped with multiple charging stations such as shown in FIGS. 1-3 and driven to an area requiring persistent endurance, providing charging capacity where needed. FIG. 7 shows such a vehicle 701. The capacity of vehicle 701 is six hangars 702, which should be sufficient for persistent operations as described herein. The hangars themselves can simply be enclosed boxes with charging facilities and an optical target 108, since the vehicle will be attended, however the arrangement of FIG. 1, or any of the other hangar arrangements described herein, could simply be mounted on the vehicle with a retractable cover as shown in FIG. 8, 801 that is removed when the vehicle 701 arrives on scene in order to launch a drone 501.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a network of distributed bases for drones, comprising the steps of:

a. basing a plurality of drones at a plurality of basing locations in an area;

b. dispatching a first drone of the plurality of drones to a location of interest in the area from a first basing location of the plurality of basing locations that is closest to the location of interest;

c. dispatching a second drone of the plurality of drones from a second basing location of the plurality of basing locations; and d. alternating the first drone and the second drone at the location of interest such that one of the first or second drone is returned to the first or second basing location for charging, and the other of the first or second drone is dispatched to the location of interest;

wherein the first and second drones collectively provide continuous monitoring of a designated target based at least in part on motion information relating to the designated target, with the second drone being pre-deployed to the second basing location in accordance with the motion information; and wherein the second drone is dispatched from the second basing location before the first drone returns for charging, responsive to a determination that the first drone has reached an endurance threshold, in order for the first and second drones to collectively provide the continuous monitoring of the designated target.

2. The method of claim 1, wherein a number of the plurality of basing locations is greater than a number of the plurality of drones.

3. The method of claim 1, wherein at least two of the basing locations are separated by a distance of at least one fourth of a rated distance range of the first or the second drone.

4. The method of claim 1, wherein at least two of the basing locations are separated by a distance of at least two miles.

5. The method of claim 1, further comprising continuously monitoring the location of interest during the alternating of the first and second drones to the location of interest provides.

6. The method of claim 5, further comprising:

dispatching a third drone of the plurality of drones to the second basing location; and alternating the third drone with the first and second drones to continuously monitor the location of interest.

7. The method of claim 6, wherein the dispatching and basing of the second and third drones is automatic.

8. The method of claim 1, wherein the plurality of basing locations are hangars.

9. The method of claim 8, further comprising autonomously dispatching the first or second drone from the hangars in response to one or more of a predetermined set of instructions, sensor data, timing guidelines, and actions of another drone.

10. The method of claim 1, wherein the closest basing location of the plurality of basing locations is a mobile basing location.

11. The method of claim 1, wherein the first or second drone is dispatched from a central location.

12. The method of claim 11, wherein the central location is a mobile location.

13. The method of claim 1, wherein basing or dispatching of the first or second drone is initiated in response to an emergency call.

14. The method of claim 1, further comprising:

a. identifying a location of the first drone and a location of the second drone;

b. identifying a location of the plurality of basing locations, each of the plurality of basing locations configured to house one or more drones of the plurality of drones;

c. based on the locations of the first and second drones and the locations of the plurality of basing locations, selecting one or more basing locations of the plurality of basing locations to be used for the first and second drones;

d. controlling the first or second drone to deploy from the plurality of basing locations to the location of interest; and e. controlling the first or second drone to dock at the selected one or more basing locations.

15. The method of claim 14, wherein the selecting of the one or more basing locations is based on a distance between the one or more basing locations and the location of interest.

16. The method of claim 15, wherein GPS location data is used to determine the distance between the one or more basing locations and the location of interest.

17. The method of claim 16, wherein a selected basing location of the one or more basing locations has a smaller distance from the location of interest than the other one or more basing locations.

18. A method of operating a network of distributed bases for drones, comprising:

a. basing a plurality of drones at a plurality of basing locations in an area;

b. dispatching a first drone of the plurality of drones to a location of interest in the area from a first basing location of the plurality of basing locations that is closest to the location of interest;

c. dispatching a second drone of the plurality of drones from a second basing location of the plurality of basing locations, the second basing location being farther from the location of interest than the first basing location;

d. dispatching the second drone from the second basing location to a third basing location of the plurality of basing locations, wherein the third basing location is nearer the location of interest than the second basing location; and e. alternating the first and second drones at the location of interest such that one of the first or second drone is returned to the first or third basing location for charging, and the other of the first or second drone is dispatched to the location of interest;

wherein the first and second drones collectively provide continuous monitoring of a designated target associated with the location of interest, with the second drone being pre-deployed to at least one of the second and third basing locations in accordance with motion information relating to the designated target; and wherein the second drone is dispatched from its current basing location before the first drone returns for charging, responsive to a determination that the first drone has reached an endurance threshold, in order for the first and second drones to collectively provide the continuous monitoring of the designated target.

19. The method of claim 18, further comprising:

a. identifying a location of the first drone and a location of the second drone;

b. identifying a location of the plurality of basing locations, each of the plurality of basing locations configured to house the first or second drone;

c. based on the locations of the first and second drones and the locations of the plurality of basing locations, selecting one or more basing locations of the plurality of basing locations to house the first and second drones;

d. controlling the first or second drone to deploy from the first, second, or third basing location to the location of interest; and e. controlling the first or second drone to dock at the selected one or more basing locations.

20. The method of claim 19, wherein the selecting of the one or more basing locations is based on a distance between the one or more basing locations and the location of interest.

21. The method of claim 1, wherein the first and second drones are configured to communicate with one another and with one or more additional ones of the drones as respective communication nodes of a mesh network.

22. The method of claim 1, wherein the motion information comprises a projected motion vector of the designated target, and wherein the first and second drones collectively provide the continuous monitoring of the designated target based at least in part on the projected motion vector, with the second drone being pre-deployed to the second basing location in accordance with the projected motion vector.

* * * * *